United States Patent [19]

Phillips et al.

[11] Patent Number: 4,887,774
[45] Date of Patent: Dec. 19, 1989

[54] SAFETY NUT ASSEMBLY FOR BACKSTAND APPARATUS

[76] Inventors: Eddie Phillips, Rt. 1 Box 361A, Rogersville, Ala. 35652; Dyle Harville, Rt. 1, Mt. Hope, Ala. 35651; Mildred Lee, Rt. 4, Box 2A, Moulton, Ala. 35650; Danny Kirby, Rt. 4, Box 246, Town Creek, Ala. 35672; Kathleen Ellison, 1011 Routon Dr., Decatur, Ala. 35601; Mary J. Smithy, 732 Cockrell Ave., Decatur, Ala. 35603; Eugene McNutt, 612 Plum Dr. SW., Decatur, Ala. 35603; Yvonne Gholston, Rt. 2, Box 95, Town Creek, Ala. 35672; Jim Brewer, 105 Holloway St., Hartselle, Ala. 35640; Charles McClure, Rt. 7, Box 203, Florence, Ala. 35630; Johnny McCay, Rt. 2, Hartselle, Ala. 35640

[21] Appl. No.: 229,308
[22] Filed: Aug. 8, 1988
[51] Int. Cl.$^4$ .................. B66B 11/04; B65H 19/30
[52] U.S. Cl. .................. 242/58.6; 74/424.8 R
[58] Field of Search .............. 242/58.6, 68, 130, 106, 242/129.5, 129.51, 129.53, 129.6, 129.7, 129.62, 129.72, 129.8, 130, 130.2, 134, 136, 137, 137.1, 138, 139, 140; 254/13, 98, 100; 187/24, 25, 8.47; 74/424.8 R, 424.8 A

[56] References Cited

U.S. PATENT DOCUMENTS

| | | | |
|---|---|---|---|
| 1,419,906 | 6/1922 | Klausmeyer | 74/424.8 A |
| 2,622,816 | 12/1952 | Koch | 242/58.6 |
| 3,298,667 | 1/1967 | Grantham et al. | 242/58.6 X |
| 3,309,060 | 3/1967 | Villars | 74/424.8 A |
| 3,687,234 | 8/1972 | Gendreau | 187/8.59 X |
| 3,833,092 | 9/1974 | Flinchbaugh | 74/424.8 R X |
| 4,279,329 | 7/1981 | Gehron | 74/428.8 R X |

Primary Examiner—Stuart S. Levy
Assistant Examiner—Steven M. duBois
Attorney, Agent, or Firm—Evelyn M. Sommer

[57] ABSTRACT

A safety nut assembly is provided for mounting to the carriage of a backstand apparatus to which a large roll of paper is rotatably mounted. The backstand apparatus includes an inclined screw spindle to which the carriage is threadedly engaged, such that rotation of the screw spindle moves the carriage therealong. The safety nut assembly comprises a mounting portion for secure but removable mounting to the carriage of the backstand. The safety nut assembly further includes a threaded aperture for threadedly engaging the inclined screw spindle. The threaded grooves of the threaded aperture in the safety nut assembly are larger than the threads of the primary weight-bearing bushing in the carriage. Thus, the safety nut assembly will assume a weight-bearing function only upon failure of the primary bushing in the carriage. The safety nut assembly may be formed from two opposed halves which can be assembled around opposed sides of the inclined screw spindle to facilitate the retrofitted mounting of the safety nut assembly to the backstand apparatus.

8 Claims, 2 Drawing Sheets

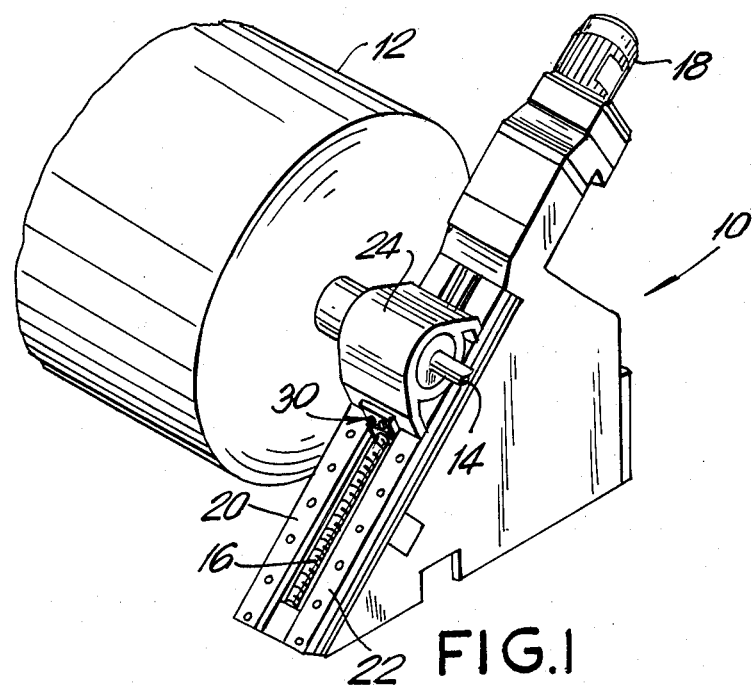
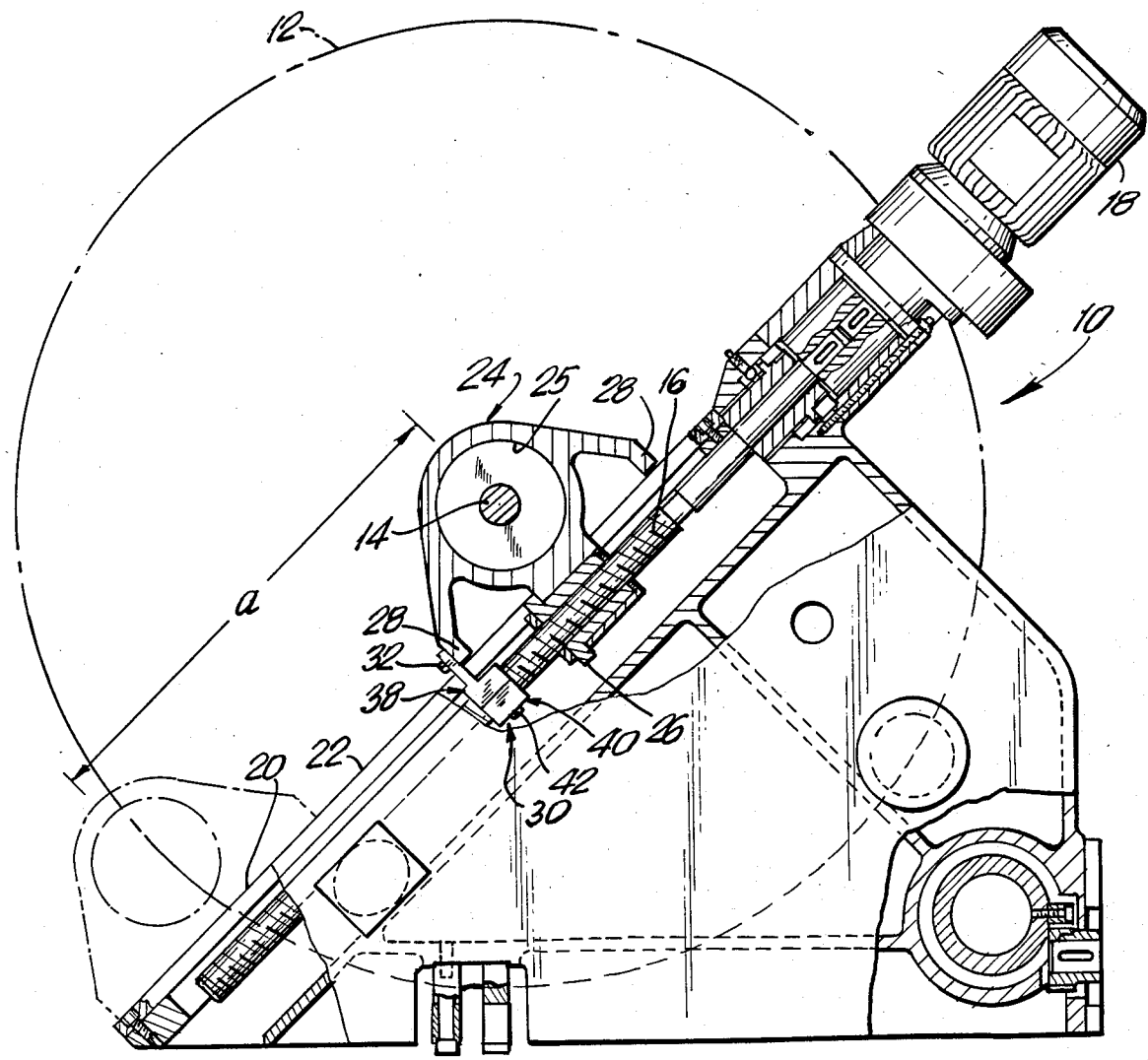

SAFETY NUT ASSEMBLY FOR BACKSTAND APPARATUS

BACKGROUND OF THE INVENTION

Stock paper often is wound into large heavy rolls prior to cutting, finishing or printing the paper for its end use. These large paper rolls may have an axial length of several feet and an initial diameter of several feet. The rolls of paper typically are wound around a core which may be mounted to an apparatus from which the paper may be unwound for subsequent finishing processes, cutting or printing. For example, the paper may be rapidly unrolled from these large heavy rolls and fed into machines where the paper may be processed to achieve the desired texture and/or finish, cut into smaller sizes, or printed.

Backstands are provided for rotatably mounting the large rolls of paper, and permitting the paper to be unwound rapidly for use in another machine. The large roll of paper may be rolled into proximity to the backstand. The core of the rolls may then be rotatably mounted to the backstand with the core of the roll being generally horizontal. The backstand then lifts the heavy roll to permit unwinding of the paper into the associated machine. The amount of elevational movement of the roll by the backstand depends on dimensional characteristics of the roll and the operational characteristics of the machine. In some instances the roll may be elevationally moved during the winding or unwinding process.

The backstand typically comprises a pair of bases each of which includes an inclined screw spindle. A carriage is threadably mounted to the inclined screw spindle. in particular, the carriage is provided with a bushing nut that is threadably mounted on the inclined screw spindle. Each carriage is further operative to rotatably mount one end of the core about which the large roll is wound. The two bases are disposed on opposite ends of the core and permit the large rolls of paper to be rotated thereon for unwinding the paper from the roll. Rotational movement of the screw spindle about its axis causes the carriage to translate along the inclined screw spindle. Thus, the rotation of the screw spindle causes the carriage to gradually move upwardly or downwardly along the inclined screw spindle to ensure that the large heavy roll of paper is in a proper elevational position relative to the associated machine.

As noted above, the rolls of paper used in the above described processes are extremely large and heavy and impose substantial stresses upon the apparatus to which they are mounted. It follows that the rotation of the screw spindle to elevate or lower the roll imposes substantial stresses on both the spindle and on the bushing nut. In particular, the bushing nuts often are manufactured from brass and are likely to wear. Excessive wear can cause the bushing nuts to strip and unintentionally slide gravitationally down the screw spindle. A failure of this type can severly injure any employee working nearby and can require a costly repair to the backstand assembly. Furthermore, the damage to the backstand results in substantial downtime for the complex machine into which the paper is being fed. The net result is that these easily damaged bushings can result in costly losses of efficiency and possible injuries to employees.

Safety devices have been developed for use with a variety of vertical screw elevators. For example, U.S. Pat. No. 4,279,329 which issued to Gehron on July 21, 1981 shows a vertical screw on which a lifting nut is disposed. The apparatus shown in U.S. Pat. No. 4,279,329 shows a safety nut integrally incorporated into the apparatus and disposed in spaced relationship below the lifting nut. In the normal operation of the apparatus, the safety nut carries none of the lifting forces. However, after the threads of the lifting nut are worn, the safety nut will come into operation. The particular connection of the complex safety nut shown in U.S. Pat. No. 4,279,329 is such that upward movement of the lift carriage is prevented, but that a controlled downward movement is possible. This is enabled by the particular arrangement of the safety nut with a lock nut and a spring element disposed therebetween.

Another prior art apparatus which incorporates a safety device into a vertical lift elevator is shown in U.S. Pat. No. 3,687,234 which issued to Gendreau on Aug. 29, 1972. This prior art reference is directed to an apparatus for lifting automobiles. The apparatus includes rotatable screws on which carrier nuts are mounted. The carrier nuts in turn are connected to the horizontal arms which are operative to lift the vehicle. As a result of this construction, the rotation of the threaded columns will cause the carrier nuts and the arms connected thereto to move upwardly or downwardly. A safety nut is mounted below the carrier nut, but peforms no weight-bearing function during normal operations. However, if the carrier nut fails, the load that had been supported by the carrier nut will be transmitted to the safety nut via a sleeve disposed therebetween. The safety nut device shown in U.S. Pat. No. 3,687,234, as in the previously described prior art, is integrally incorporated into a complex lift apparatus.

U.S. Pat. No. 3,309,060 shows a fork-lift where the lifing action is achieved by movement of a bearing nut along a vertical threaded column. The apparatus further includes a safety nut disposed below the bearing nut. As in the previously described reference, the safety nut normally does not perform a load-bearing function. However, as with the previously described references, the safety nut will peform a load-bearing function relative to the vertical threaded column upon a failure of the bearing nut. Once again, however, the safety nut is intregrally built into the complex apparatus.

In view of the above, it is an object of the subject invention to provide a safety nut apparatus that can be retrofitted onto an existing machine.

It is a further object of the subject invention to provide a safety nut apparatus that can be incorporated into a backstand for moving large rolls of paper.

Still a further object of the subject invention is to provide a safety nut apparatus for use with an inclined screw spindle for moving large rolls of paper relative to a paper processing machine.

SUMMARY OF THE INVENTION

The subject invention is directed to a safety nut apparatus that can be incorporated onto an existing backstand for moving large rolls of paper. More particularly, the backstand includes a pair of spaced apart support bases each of which comprises an inclined screw spindle. A carriage is mounted to the screw spindle by means of a threaded bushing such that rotation of each inclined screw spindle causes the respective carriages thereof to move longitudinally along the corresponding inclined screw spindle. In this manner, a large roll of paper mounted intermediate the two spaced apart carriages can be selectively raised and lowered to ensure that the paper being dispensed from the roll is properly aligned to an adjacent cooperating apparatus for processing the paper.

The apparatus further comprises a safety nut assembly removably mounted to each carriage and threadably engaged with the inclined screw spindle. More particularly, the safety nut apparatus comprises a mounting flange which may have a plurality of apertures extending therethrough for receiving bolts. The bolts in turn are threadedly engaged in tapped holes in the carriage such that the safety nut assembly is securely mounted to the carriage. The mounting apertures in the flange may be of generally elliptical configuration to facilitate alignment of the carriage relative to the tapped apertures in the carriage. The safety nut apparatus further comprises a threaded aperture having threads which are slightly greater in width than the threads of the inclined screw spindle. More particularly, the threads may be 0.0006 inch to 0.0010 inch larger in width than the threads of the primary threaded bushing of the carriage. As a result, the threads of the safety nut assembly are dimensioned to move along the inclined screw spindle with the carriage which in turn is driven by the weight-bearing threaded bushing. However, upon a stripping or other such failure of the threaded bushing, which normally carries the primary load, the safety nut will engage the inclined screw spindle to ensure that the large heavy roll of paper remains substantially in its proper alignment, and to further ensure that no residual machine damage or personal injury is caused by an abrupt uncontrolled movement of the paper along the backstand apparatus. The safety nut assembly may be formed from two separable halves to facilitate mounting onto an existing backstand. More particularly, the safety nut assembly may be divided longitudinally along a plane extending through the longitudinal axis of the threaded aperture thereto. The tow halves of the assembly may be securely but releasably connected to one another by, for example, a threaded interengagement of bolts with each half of the assembly.

BRIEF DESCRIPTION OF THE DRAWINGS

FIG. 1 is a perspective view of a backstand lift apparatus having the subject safety nut assembly mounted thereto.

FIG. 2 is a side elevational view of the apparatus shown in FIG. 1.

DETAILED DESCRIPTION OF THE PREFERRED EMBODIMENT

Figure 3:
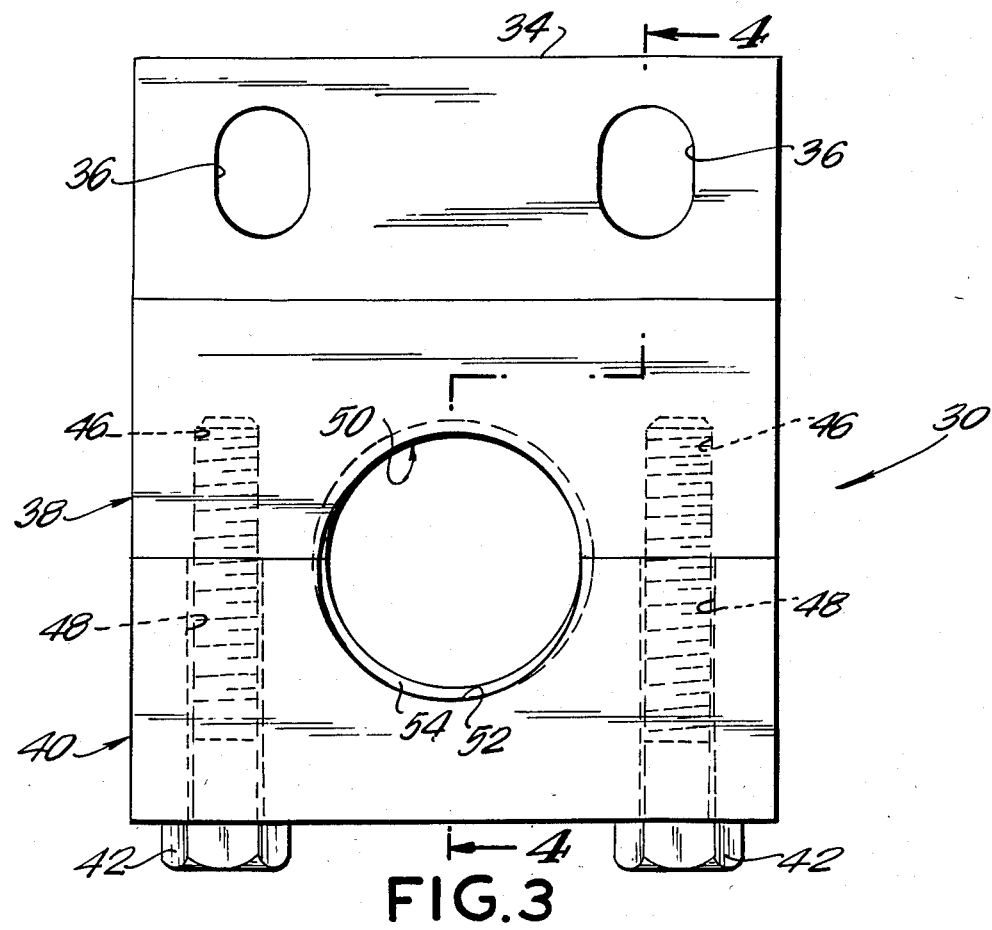
FIG. 3 is a top plan view of the safety nut assembly of the subject invention.

The backstand apparatus of the subject invention is indicated generally by the numeral 10 in FIG. 1. The backstand apparatus 10 is operative to rotatably mount a large roll of paper 12 with its longitudinal axis 14 aligned generally horizontally. The roll of paper 12 may intially be 4 to 6 feet in diameter and may have an axial length of approximately equal or greater dimensions. As a result, the rolls of paper 12 are extremely heavy. The backstand 10 is used in conjunction with another paper processing machine which receives paper delivered from the roll 12 for further fabrication or processing steps. The paper leaving the roll 12 will typically leave the roll 12 from a bottom center position about the circumference of the roll 12. The paper traveling from the roll 12 to the apparatus used with the backstand 10 will generally travel along a horizontal plane.

The backstand 10 comprises an inclined screw spindle 16 which is angularly aligned to the horizontal and is rotatably mounted in the backstand 10. More particularly, the inclined screw spindle 16 is rotatably driven by a motor 18 mounted at one end thereof. The backstand 10 further comprises a pair of support surfaces 20 and 22 which extend generally parallel to the inclined screw spindle 16. Although only a single backstand apparatus 10 is illustrated in FIG. 1, it is to be understood that substantially identical backstands 10 are disposed at opposite ends of the roll 12.

The backstand 10 further comprises a carriage 24 movably mounted thereto. More particularly, the carriage 24 includes a central aperture into which the axis 14 of the roll 12 is rotatably mounted. The carriage 24 further comprises a threaded bushing 26 securely mounted therein. The threaded bushing 26 comprises an array of internal threads which are engaged with the external threads of the inclined screw spindle 16. The carriage 24 further comprises support legs 28 which are aligned approximately with the support surfaces 20 and 22 of the backstand 10. The support legs will initially generally align a central aperture 25 in the carriage 24 approximately parallel to the alignment of the roll 12 of paper. More particularly, the legs 28 prevent the carriage 24 from rotating about the inclined screw spindle 16 thereby facilitating the alignment of the carriage 24 with the axis 14 when a roll of paper 12 is being mounted thereon. The presence of the axis 14 within the carriage 24 keeps the legs 28 from binding against either support surface 20 or 22 of the background 10, and further prevents rotation of the carriage 24 about the inclined screw spindle 16. As a result the rotation of the screw spindle 16 under the action of the motor 18 will cause the carriage 24 to move longitudinally along the inclined screw spindle 16. The range of movement of the carriage 24 along the inclined screw spindle 16 is indicated by dimension "a" in FIG. 2 which may be approximately equal to 35 inches.

The presence of the extremely large heavy roll of paper 12 on the backstand 10 imposes substantial forces on the engagement of the threaded bushing 26 with the inclined screw spindle 16. As a result, a stripping or other such failure of the threaded bushing 26 is possible. This failure in connection with the extremely large and heavy roll of paper 12 can cause injury to personnel working nearby and can severly damage the complex and costly backstand apparatus 10. Furthermore, such a failure causes substantial downtime in any apparatus used in combination with the backstand 10. To prevent any significant failure of this type, the backstand 10 is provided with a safety nut assembly 30. More particularly, the safety nut assembly 30 is securely but removably mounted to the carriage by bolts 32. The bolts 32 extend through apertures in the safety nut assembly 30 and are threadably engaged in tapped apertures in a support leg 28 of the carriage 24.

Figure 4:
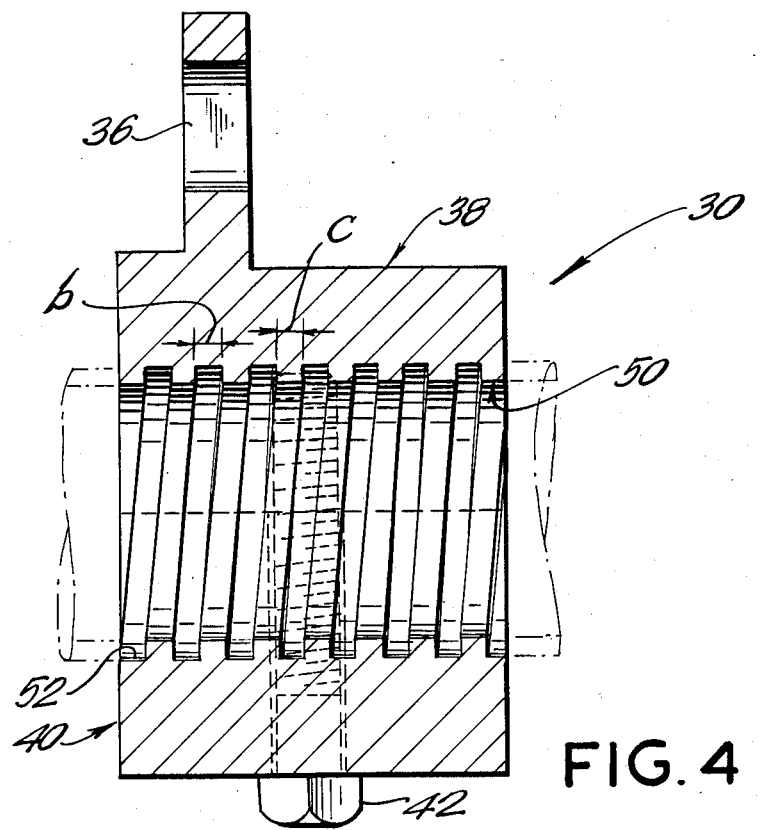
FIG. 4 is a cross-sectional view taken along line 4—4 in FIG. 3.

The safety nut assembly 30 is illustrated more clearly in FIGS. 3 and 4. More particularly, the safety nut assembly 30 comprises a mounting flange 34 extending unitarily from a portion of the safety nut assembly 30. The mountoing flange 34 is provided with a pair of generally elliptical mounting slots 36 which are dimensioned to receive the bolts 32 for mounting the safety nut assembly 30 onto the carriage 24.

The safety nut assembly 30 further comprises opposed spindle mounting halves 38 and 40 which are securely but removably connected to one another by threaded bolts 42. More particularly, the spindle mounting member 38 is provided with a tapped aperture 46 dimensioned to threadably receive the bolt 42. Similarly, the spindle mounting portion 40 is provided with an aperture 48 through which the bolt 42 may pass. The threaded engagement of the bolts 42 with the tapped apertures 46 securely retains the spindle mounting portions 38 and 40 in their assembled condition. It is noted, with respect to FIG. 4, that the mounting flange 34 is unitary with the spindle mounting portion 38 of the safety nut assembly 30.

The safety nut assembly 30 further comprises a threaded spindle mounting aperture 50 extending entirely therethrough. In particular, the threaded spindle mounting aperture 50 is disposed to extend substantially equally into juxaposed portions of the spindle mounting halves 38 and 40. The array of internal threads 50 define alternating grooves 52 and ridges 54. As shown most clearly in FIG. 4, the grooves 52 define a longitudinal dimension "b" which exceeds the corresponding dimension on the bushing 26 by between approximately 0.0006 inch–0.0010 inch. The ridges 54 define a correspondingly shorter longitudinal dimension "c".

The safety nut assembly 30 is employed by mounting the threaded spindle aperture 50 onto the inclined screw spindle 16 of the backstand 10. This mounting of the safety nut assembly 30 to the inclined screw spindle 16 may be accomplished by threadably disengaging the bolts 42 to permit the safety nut halves 38 and 40 to be disengaged from one another. The halves 38 and 40 are then positioned around the inclined screw spindle 16 such that the mounting flange 34 of the assembly 30 is in proximity to the support leg 28 of the carriage 24. The mounting flange 34 can then be bolted to the support leg 28 by bolts 32 as depicted in FIG. 2. The halves 38 and 40 are then secured to one another by bolts 42.

By virtue of the greater dimension "b" of the thread grooves 52 and the shorter dimension "c" of the thread ridges 54, the safety nut assembly 30 will peform no load bearing function on the inclined screw spindle 16. However, upon a failure of the primary bushing 26, the safety nut assembly 30 will threadably engage the inclined screw spindle 16. It will be appreciated that the subject safety nut assembly 30 can readily be retrofitted onto an existing backstand apparatus 10 to achieve a safety standard that would otherwise not be available on the existing apparatus.

While the invention has been described with respect to a preferred embodiment, it is apparent that various changes can be made without departing from the scope of the invention as defined by the appended claims.

We claim:

1. A safety nut assembly for mounting to a paper roll backstand apparatus, said backstand apparatus comprising an inclined rotatable screw spindle having an array of external threads thereon and a carriage having a threaded bushing securely mounted in said carriage and threadably engaged with the inclined screw spindle, said carriage comprising means for rotatably mounting a large roll of paper thereon, said safety nut assembly comprising:

a spindle mounting portion having an internally threaded spindle aperture extending entirely therethrough, said spindle aperture being characterized by an array of internal threads of slightly larger dimension than the threads of said threaded bushing such that said safety nut assembly performs no weight bearing function while said threaded bushing is engaged with said inclined screw spindle, but such that said safety nut assembly performs a weight-bearing function upon a failure of the threaded bushing; and means for removably mounting said spindle mounting portion to said carriage, wherein said carriage of said backstand comprises a plurality of threaded apertures therein, and wherein said means for mounting said safety nut assembly to said carriage comprises a pair of mounting apertures extending through a portion of said safety nut assembly and an equal plurality of bolts dimensioned to pass through said mounting apertures and to threadably engage the threaded apertures in said carriage.

2. A safety nut assembly as in claim 1, wherein said spindle mounting portion comprises first and second spindle mounting halves disposed in face-to-face relationship along a plane extending centrally through the spindle mounting aperture thereof, said safety nut assembly further comprising means for removably mounting said spindle mounting halves to one another.

3. A safety nut assembly as in claim 1, further comprising a mounting flange extending unitarily from said spindle mounting portion, said mounting apertures extending through said mounting flange.

4. A safety nut assembly as in claim 3, wherein said mounting apertures are generally elliptical to facilitate alignment of said assembly with the threaded apertures in said carriage.

5. A safety nut assembly as in claim 1, wherein the threads thereof exceed the dimensions of the threads in said threaded bushing by approximately 0.0006 inch–0.0010 inch.

6. A backstand apparatus for rotatably mounting a large roll of paper thereto, said backstand apparatus comprising an inclined screw spindle supported at an acute angle to a horizontal plane, means for rotating said inclined screw spindle about its longitudinal axis, a carriage for rotatably mounting a large roll of paper, said carriage comprising a primary internally threaded bushing securely mounting therein, said primary bushing being threadably engaged with said included screw spindle such that rotation of said inclined screw spindle about its longitudinal axis causes said carriage to translate along said inclined screw spindle, a safety nut assembly securely but removably mounted to said carriage, by a plurality of bolts, said safety nut assembly comprising a spindle mounting portion having an internally threaded spindle aperture surrounding and in threadably engagement with the inclined screw spindle, said internally threaded spindle aperture being characterized by an array of internal threads having dimensions which exceed the dimension of the threads of said primary bushing, the spindle mounting portion of said safety nut assembly being defined by opposed spindle mounting portion halves which are symmetrically disposed on opposite sides of a plane passing through the longitudinal axis of said included screw spindle, said safety nut assembly further comprising means for securely but removably retaining said spindle mounting portion halves of said safety nut assembly together, whereby the safety nut assembly can be mounted to said backstand apparatus, and whereby said safety nut assembly peforms a weight-bearing function only upon failure of said primary bushing.

7. A backstand apparatus as in claim 6, wherein the threads of said safety nut assembly are larger than the threads of said primary bushing by between 0.0006 inch–0.0010 inch.

8. A backstand apparatus as in claim 6, wherein the halves of said spindle mounting portion are securely but removably connected to one another by a plurality of bolts.

* * * * *

UNITED STATES PATENT AND TRADEMARK OFFICE
CERTIFICATE OF CORRECTION

PATENT NO. : 4,887,774
DATED : December 19, 1989
INVENTOR(S) : Eddie Phillips, et al.

It is certified that error appears in the above-identified patent and that said Letters Patent is hereby corrected as shown below:

Title page, item (73) should read -- Champion International Corporation, Stanford, CT.

Signed and Sealed this

Second Day of March, 1993

Attest:

STEPHEN G. KUNIN

*Attesting Officer*   Acting Commissioner of Patents and Trademarks